Dec. 14, 1948.          P. L. FRANCK          2,456,498
DIRECTION SIGNAL
Filed Sept. 29, 1947
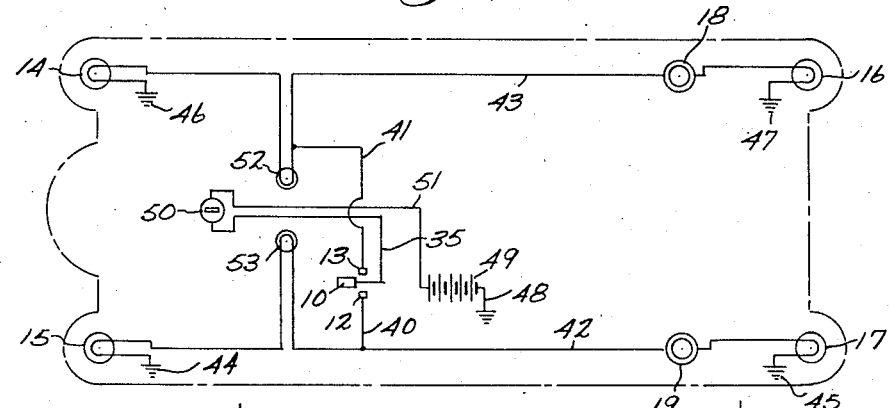
Fig. 1.
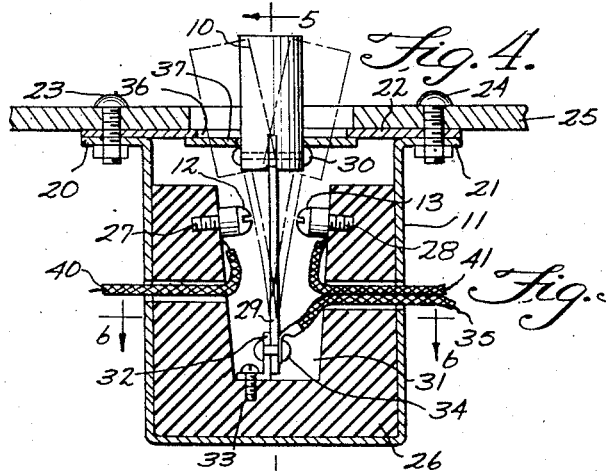
Fig. 3.
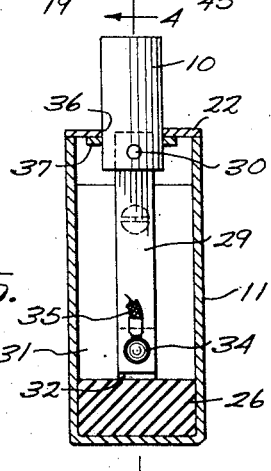
Fig. 2.
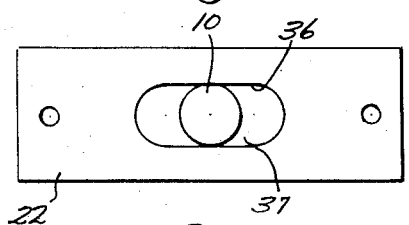
Fig. 6.
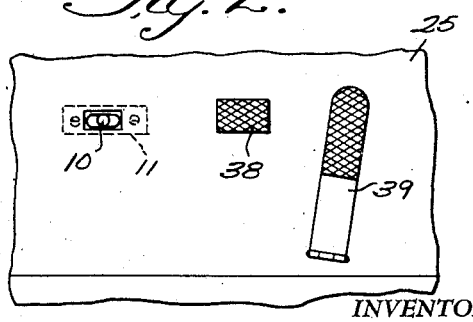
INVENTOR.
Paul L. Franck,
BY Victor J. Evans & Co.
ATTORNEYS Patented Dec. 14, 1948

2,456,498

UNITED STATES PATENT OFFICE 2,456,498

DIRECTION SIGNAL

Paul L. Franck, Washington, D. C.

Application September 29, 1947, Serial No. 776,665

1 Claim. (Cl. 200—6)

This invention appertains to direction signals for automobiles and other vehicles, and more particularly to a control therefor, by means of which the driver of an automobile may quickly and accurately indicate to traffic approaching from either direction, front or rear, the intention of the driver to make a right or left hand turn and thus prevent collision between proximal vehicles.

One of the several objects of the invention is to provide a unique control for a signal of this character, which is so arranged for foot operation, preferably by the left foot, so as to make it entirely unnecessary that a driver remove or loosen his or her grip on the steering wheel, the operation being effected with the same facility as that of the brake and clutch pedal controls of a motor vehicle and with the least possible chance for mistake in proper signal indication.

Another object of the invention lies in the provision of a novel form of button switch, that is adapted to be mounted on the under side of a floor board of a motor vehicle with its button projecting upwardly therethrough, the button being provided with means whereby it may be pushed to either side and which when released will return to a neutral centrally disposed position.

A further object of the invention is to provide a control switch of this kind, that is simple in design, made from low cost material, easy to install and operate, practically foolproof, and inconspicuous in appearance, its floor location and foot actuation eliminating the need for all other signal controls, particularly those that are usually mounted either on the dash or the steering post or wheel.

Yet another object of the invention is to provide a directional signal system for motor vehicles, which is comprised in independent circuits for right and left hand turn indications, that can be operatively energized only when the ignition control switch is closed for motor operation.

With these and other objects and advantages in view, the invention resides in the certain new and useful combination, construction, and arrangement of parts and circuits, as will be hereinafter more fully described, set forth in the appended claim, and illustrated in the accompanying drawing, in which:

Figure 1 is a view illustrating the relative positions of the parts on a motor vehicle.

Figure 2 is a detail showing the position of the signal actuating button in relation to the brake and accelerator pedals.

Figure 3 is a plan view of the button casing.

Figure 4 is a longitudinal section through the switch casing taken on line 4—4 of Figure 5.

Figure 5 is a cross section through the casing taken on line 5—5 of Figure 4.

Figure 6 is a sectional plan through the casing taken on line 6—6 of Figure 4.

Referring now to the drawings wherein like reference characters indicate corresponding parts, the direction signal of this invention includes a button 10 in a substantially rectangular-shaped casing 11, having contact points 12 and 13, and a circuit having signal lights 14 and 15 at the front, 16 and 17 at the rear, and flashers 18 and 19.

The casing is formed with an open upper end having flanges 20 and 21 at the ends to which a cover plate 22 is attached by bolts 23 and 24, and when installed in a motor vehicle the cover plate is positioned below the floor 25, as shown in Figure 4.

The contact points 12 and 13 are mounted in a U-shaped block of wood, or other suitable material, as indicated by the numeral 26, by screws 27 and 28 and the block is secured in the casing by a press fit. The button 10 is mounted on the upper end of a resilient strip 29 by a pin 30 and the strip 29 is mounted in an opening 31 in the block by a clip angle 32 which is held in the block by a screw 33. The strip 29 is secured to the clip angle by a pin 34 and a wire 35 is also held by the pin.

The button 10 extends through an opening 36 in the cover plate 22 and a washer 37 of heavy paper or the like is positioned on the button below the cover plate wherein it will rest on the ends of the pin 30 so that it will provide a closure for the opening 36.

As will be noted in Figures 1 and 2 the button 10 is located in the floor of a vehicle to the left of the brake pedal 38 and accelerator pedal 39 and the contacts 12 and 13 are connected by wires 40 and 41 to wires 42 and 43 respectively in which the front, rear, and flasher lights of the vehicle are provided. The opposite ends of the wire 42 are grounded at the points 44 and 45, and the ends of the wire 43 are grounded at the points 46 and 47, and with one terminal 48 of a battery 49 grounded and the other terminal connected to the button strip 29 through the ignition switch 50 by wires 51 and 35, a circuit may be completed to the lights on either side of the vehicle by moving the button toward either side as illustrated by the dotted lines in Figure 4. The circuits are also provided with indicator lights 52 and 53 that may be positioned on the instrument board of the vehicle to show that the lights are working. By this means the operator of a motor vehicle may actuate the signal button 10 by the toe of his left foot without moving his hands to warn operators of vehicles approaching from the front and rear that he intends to turn to the right or left.

The signal lights at the front and rear may be mounted on any suitable parts of the vehicle and should be positioned where they will be readily observed from both the front and rear. These signals may also be used in combination with other lights or devices of the vehicle as may be desired.

Having thus fully described my invention, it is to be understood that the signal control switch is subject to changes in the design and minor details of construction and arrangement of the parts to which it may be found to be susceptible, without departing from the spirit of the invention, or its scope as claimed.

What is claimed is:

In a motor vehicle signal light actuating switch, the combination, which comprises, a relatively thin rectangular-shaped casing having outwardly disposed mounting flanges at the ends of the upper end, a cover plate having a slot therein positioned on the flanges, a U-shape block having a base and upwardly extending arms mounted in the casing with a press fit, contact screws threaded into the inner surfaces of the arms spaced from the upper ends thereof, a flat resilient strip mounted on the base of the block positioned midway between the arms thereof, a button mounted on the upper end of the strip and extending through the slot in the cover, and wires connected to the contact screws and strip extending through openings in the arms of the block and ends of the casing.

PAUL L. FRANCK.

REFERENCES CITED

The following references are of record in the file of this patent:

UNITED STATES PATENTS

| Number | Name | Date |
|---|---|---|
| 421,636 | Titus | Feb. 18, 1890 |
| 774,896 | Robertson | Nov. 15, 1904 |
| 1,176,943 | Bollinger | Mar. 28, 1916 |
| 1,768,885 | Burrows | July 1, 1930 |
| 2,306,326 | Bair | Dec. 22, 1942 |
| 2,310,793 | Kryl | Feb. 9, 1943 |